Nov. 25, 1958
B. E. PLATT
2,861,293
POULTRY GIZZARD SKINNER
Filed Aug. 8, 1957
3 Sheets-Sheet 1
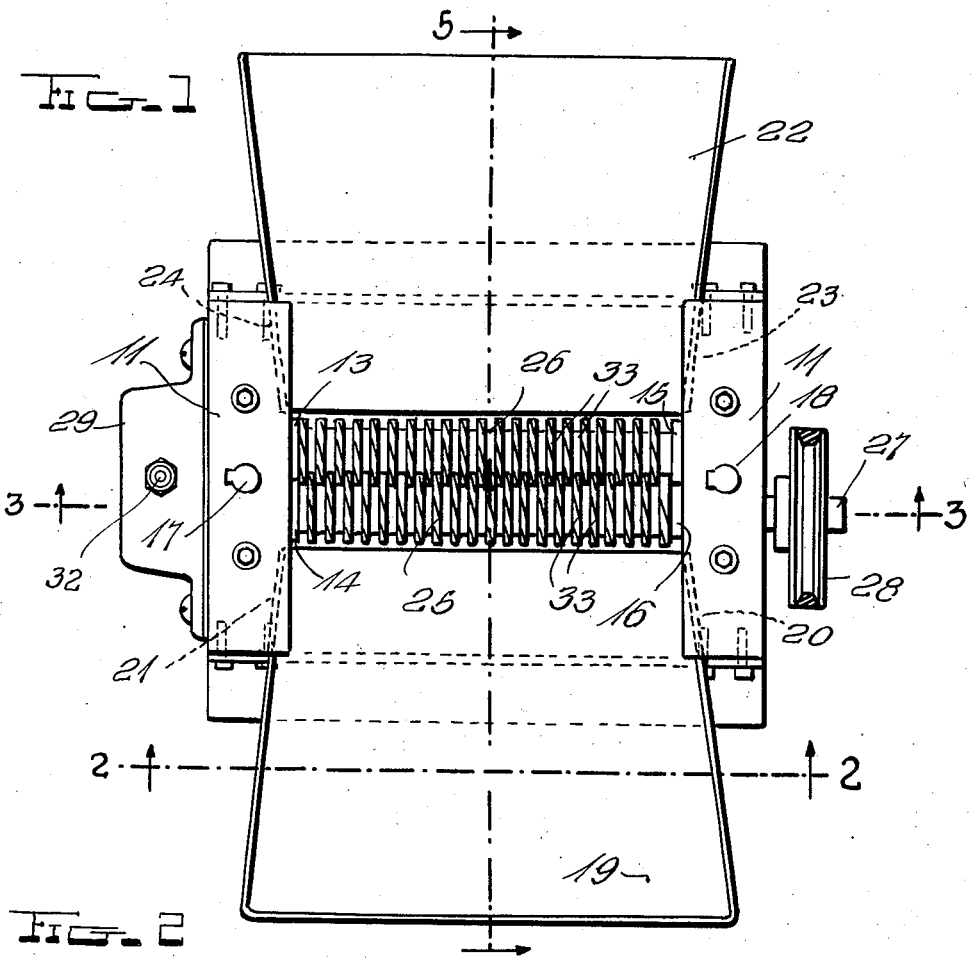
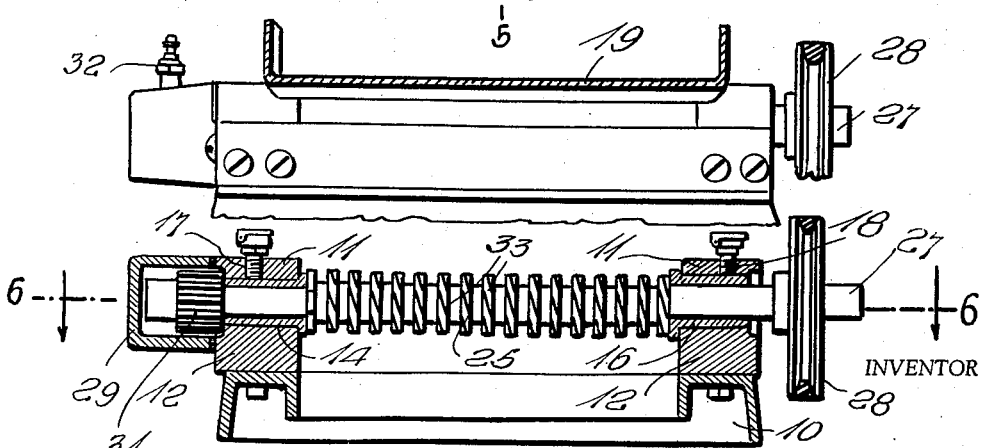
INVENTOR
BEN E. PLATT,
BY
ATTORNEY Nov. 25, 1958 B. E. PLATT 2,861,293
POULTRY GIZZARD SKINNER
Filed Aug. 8, 1957 3 Sheets-Sheet 2
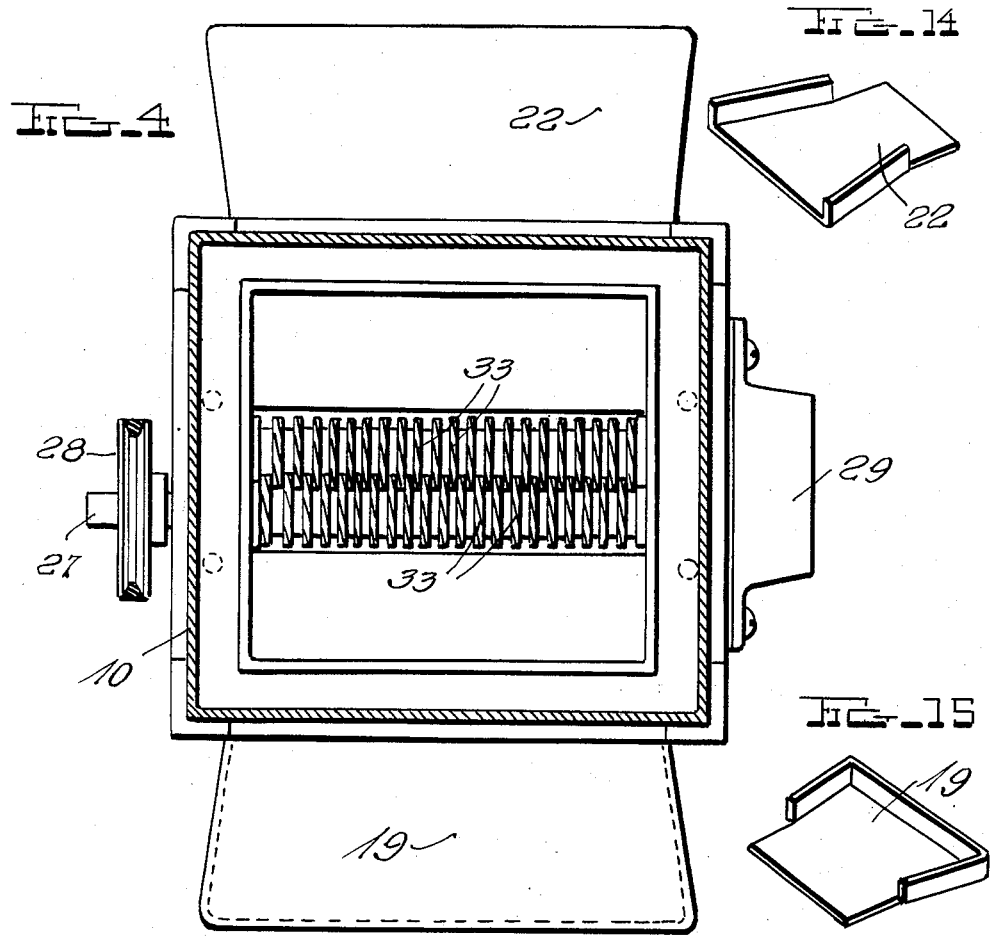
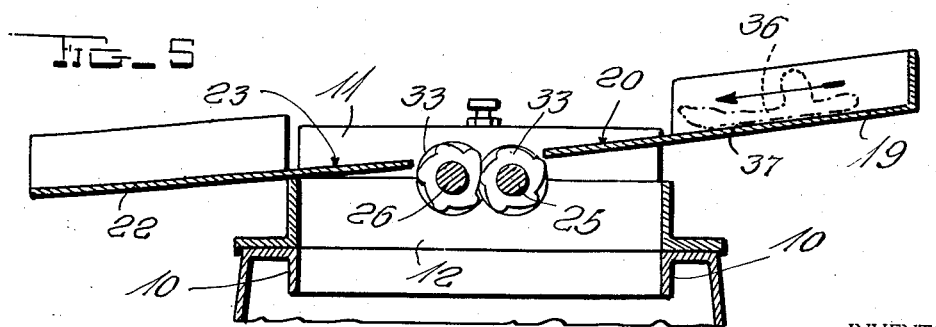
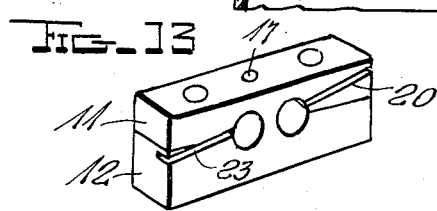
INVENTOR
BEN E. PLATT,
BY
ATTORNEY

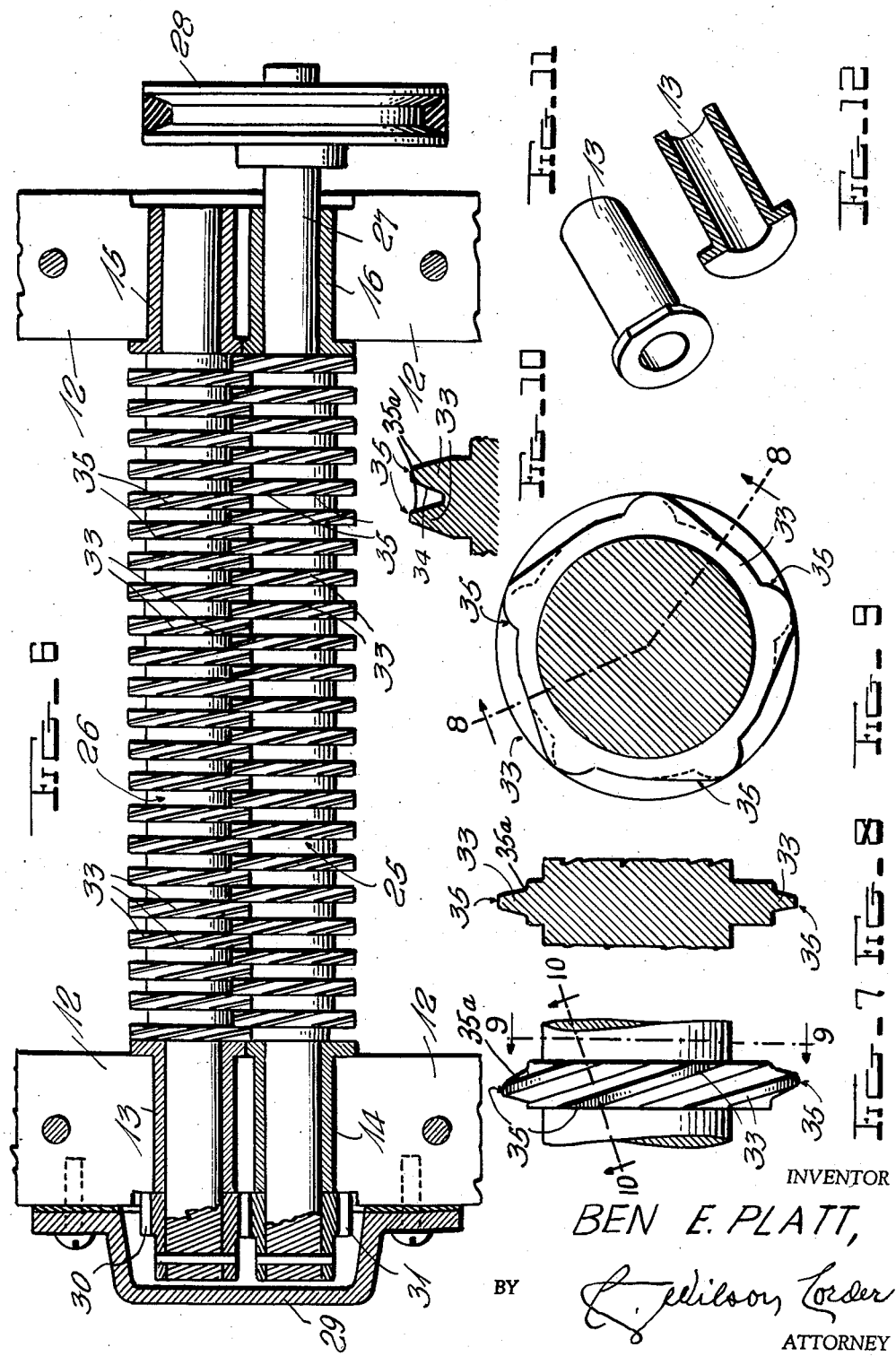

United States Patent Office 2,861,293
Patented Nov. 25, 1958

2,861,293

POULTRY GIZZARD SKINNER

Ben E. Platt, Gainesville, Ga.

Application August 8, 1957, Serial No. 676,955

9 Claims. (Cl. 17—11)

This invention relates to the poultry industry, and more particularly to a new and improved apparatus for and method of removing the linings from the gizzards of fowls.

Heretofore various devices to accomplish this general purpose have been proposed, but such have only been moderately successful for a number of reasons, including loss of meat, relative slowness of operation, difficulty of cleansing, et cetera.

An object of the instant invention is to provide a poultry gizzard skinner that operates with a minimum of meat loss.

Another object is to make possible increased speed of operation in such a device.

Another object is to make cleaning easy and almost automatic.

A still further object is to provide rigidity of construction and long life in a gizzard skinner.

Another object is to make possible ease of maintainance in a device of the instant type.

Another object is to afford ease of operation to the extent that the machine may be operated by unskilled or at most semi-skilled labor.

These and other objects made apparent during the further progress of this specification are made possible by the instant invention, a full and complete understanding of which is facilitated by reference to the drawings herein, in which:

Fig. 1 is a top plan view of the device;

Fig. 2 is a vertical sectional view taken along the line 2—2 of Fig. 1, looking in the direction of the arrows;

Fig. 3 is likewise a transverse vertical sectional view taken along the line 3—3 of Fig. 1, looking in the direction of the arrows.

Fig. 4 is a bottom plan view of the instant device;

Fig. 5 is a vertical sectional view taken along the line 5—5 of Fig. 1;

Fig. 6 is an enlarged sectional view taken substantially along the line 6—6 of Fig. 3;

Fig. 7 is an enlarged side elevational view of a portion of one of the cutting rolls;

Fig. 8 is a transverse sectional view taken along the line 8—8 of Fig. 9;

Fig. 9 is a similar view taken along the line 9—9 of Fig. 7;

Fig. 10 is an enlarged detailed sectional view taken along the line 10—10 of Fig. 7;

Fig. 11 is an enlarged view in perspective of one of the bearing sleeves employed herein;

Fig. 12 is a similar view showing one section of said bearing;

Fig. 13 is a view in perspective of the bearing block, showing grooves or recesses for receiving feed and discharge pans;

Fig. 14 is a view in perspective of the left or discharge pan; and

Fig. 15 is a similar view of the right or feeding pan.

Referring now to the drawings, 10 is a supporting frame on opposite side of which are disposed a pair of blocks 11 and 12, said blocks having journaled therein, bearings 13, 14, 15, and 16. Suitable lubricating apertures 17 and 18 are provided in the tops of said blocks.

A feeding pan 19 engaged the blocks as through slots 20 and 21, and a somewhat similar discharge pan 22 likewise engages said blocks on a somewhat lower plane through slots 23 and 24, the arrangement being such that gizzards are automatically fed to the cutting or skinning rolls and likewise discharged therefrom without endangering the hands of the worker tending the machine.

Special attention is now directed to cutting rolls 25 and 26, which are mounted in bearings 13, 14, 15 and 16, bearing 16 having a shaft 27 extending from block 11, and receiving a driving pulley 28 is rotated by a source of power such as an electric motor and conventional drive belt (not shown). Or the power source may be connected directly to the shaft and roll if so desired.

Adjacent to block 12 is attached a gear box 29, and fixedly mounted on the ends of rolls 25 and 26 within said box are a pair of gears 30 and 31, the former serving to drive roll 26; the two cutting elements being rotated in opposite directions by the arrangement shown in the drawings when the device is operative. A lubricating orifice 32 is preferably positioned in the top of 29.

Of prime importance to the instant invention is the fact that rolls 25 and 26 instead of being provided with knurled or serrated surfaces as in the case of prior art devices, are formed with interdigited angular cutting teeth 33, which in cross-section have the shape of truncated pyramids 34 (see Figs. 10, 9, 8 and 7 of the drawings). High points 35 formed in said teeth may extend uniformly across the rolls in horizontal relationship as shown in Fig. 6 for example, or may be staggered if desired, this latter arrangement presenting a more effective skinning arrangement under certain conditions.

These angular cutting surfaces 33 offer constant facets 35a which in effect peel the lining from the gizzard as opposed to tearing such with a plyer-like action with attendant substantial loss of meat as in the case of devices known heretofore in the poultry industry.

A preferred angle for said cutting surfaces from axes is from 50 to 75 degrees, machines now in use employing a 73 degree angle, although no limitation is intended or implied by this fact, the angle being a matter of choice under given operating conditions, the new principle here involved being the important factor.

While from the foregoing the operation of the instant device is believed to be obvious, it will be noted that a gizzard such as 36 is first cut open and then placed with its lining 37 down on feeding pan 19 over which the gizzard moves to rollers 25 and 26, and upon removal of the gizzard lining, to discharge pan 22.

In this connection it will be noted that the lining is cut, thereby loosening such from the meaty part of the gizzard. The practically uninterrupted roll surfaces tend to wind up or peel the lining, while the angular surfaces of the rolls running towards each other exert a horizontal pulling action on said lining without the tendency in present devices to pull in the meat between the rolls or into a center line. In the case of the old or prior art rolls, scrapers are used to keep the surfaces between the knurled or serrated surfaces thereof, clean, but even then additional manual cleaning is required at frequent intervals. In the instant device the rolls clean themselves because of the angular cutting teeth employed.

The new rolls further greatly reduce the hazard to the hands of operators of subject invention.

While there has been described in considerable detail herein. one form of the instant machine, no limitations are implied thereby, it being apparent that changes, reconstructions, rearrangements, modifications and the like may be resorted to without departing from the claims which are to be fairly construed in keeping with the contribution to the art.

I claim:

1. In a device of the character described, a supporting frame, blocks on opposite sides thereof, a pair of rolls each having a plurality of spaced angular cutting teeth disposed around the peripheral edges thereof, said edges having a contour approximating that of an inverted pyramid, said rolls being journaled in said blocks with the cutting edges of one roll interdigitating with similar surfaces of the other roll, and means connecting with said rolls for driving the rolls in opposite directions.

2. A device of the character described, a supporting framework, blocks on opposite sides thereof, a pair of rolls each having a plurality of spaced angular cutting teeth disposed around the peripheral edges thereof, said edges having a contour approximating that of an inverted pyramid, said rolls being journaled in said blocks with the cutting edges of one roll interdigitating with similar surfaces of the opposite roll, and power means connecting with the rolls for driving said rolls in opposite directions of rotation.

3. In a device of the character described, a supporting frame, blocks anchored to opposite sides thereof, a plurality of rolls, each having spaced angular cutting teeth disposed around the peripheral edges thereof, said edges having a contour approximating that of an inverted pyramid, said rolls being journaled in said blocks with the cutting edges of one roll interdigitating with smilar surfaces of another roll, power means connecting with the rolls for driving said rolls in opposite directions of rotation, and means adjacent the rolls for feeding fowl gizzards to said rolls for the purpose of cutting the linings therefrom.

4. In a device of the character described, a supporting framework, blocks anchored to opposite sides thereof, a plurality of rolls, each having spaced angular cutting teeth disposed around the peripheral edges thereof, said edges having a contour approximating that of an inverted triangle, said rolls being journaled in said blocks with the cutting edges of one roll interdigitating with similar surfaces of the adjacent roll, power means connecting with the rolls for driving said rolls in opposite directions of rotation, means associated with the rolls for feeding poultry gizzards to said rolls, and means adjacent the rolls for receiving said gizzards when the linings thereof have been removed by the cutting action of the rolls.

5. In a device of the character described, a supporting frame, a plurality of rolls, each having spaced cutting teeth disposed around the peripheral edges thereof, said edges being positioned at an angle to the central axes of the rolls said rolls being journaled in said frame with the cutting edges of one roll interdigitating with the cutting surfaces of the adjacent roll, and means connecting with the rolls for driving said rolls in opposite directions of rotation.

6. In a device of the character described, a roller having spaced cutting teeth disposed around the peripheral edges thereof, said edges being disposed at an angle to the central horizontal axis of the roller, and means connecting therewith for driving said roller.

7. A roll for use in a fowl gizzard skinner, comprising a substantially cylindrical shaft having spaced therealong at least two substantially raised cylindrical cutting surfaces of greater diameter than said shaft, said cutting surfaces having a plurality of helically arranged grooves therein forming a plurality of cutting edges.

8. A pair of interdigited rolls for use in a fowl gizzard skinner, comprising in the case of each roll, a substantially cylindrical shaft having spaced therealong at least two substantially raised cylindrical cutting surfaces of greater diameter than said shaft, said cutting surfaces having a plurality of helically arranged grooves therein forming a plurality of cutting edges.

9. A plurality of interdigited rolls for use in a fowl gizzard skinner, comprising in the case of each roll, a substantially raised cylindrical shaft having spaced therealong at least two substantially cylindrical cutting surfaces of greater diameter than said shaft, said cutting surfaces having a plurality of helically arranged grooves therein forming a plurality of cutting edges therebetween.

References Cited in the file of this patent

UNITED STATES PATENTS

| | | |
|---|---|---|
| 2,620,510 | Darrow et al. | Dec. 9, 1952 |
| 2,630,599 | Grant et al. | Mar. 10, 1953 |
| 2,657,424 | Biddinger et al. | Nov. 3, 1953 |
| 2,660,756 | Darrow et al. | Dec. 1, 1953 |
| 2,791,789 | Shickel et al. | May 14, 1957 |